United States Patent
Gelabert et al.

(10) Patent No.: US 10,412,756 B2
(45) Date of Patent: Sep. 10, 2019

(54) DEVICES, NODES AND METHODS IN A WIRELESS COMMUNICATION NETWORK

(71) Applicant: Huawei Technologies Co., Ltd., Shenzhen (CN)

(72) Inventors: Xavier Gelabert, Kista (SE); Henrik Lundqvist, Kista (SE); Mario Costa, Helsinki (FI); Petteri Kela, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/693,526

(22) Filed: Sep. 1, 2017

(65) Prior Publication Data

US 2017/0367111 A1  Dec. 21, 2017

Related U.S. Application Data

(63) Continuation of application No. PCT/EP2015/054387, filed on Mar. 3, 2015.

(51) Int. Cl.
*H04W 72/12* (2009.01)
*H04W 72/04* (2009.01)
(Continued)

(52) U.S. Cl.
CPC ....... *H04W 72/1268* (2013.01); *H04W 24/02* (2013.01); *H04W 72/042* (2013.01); *H04W 74/0833* (2013.01); *H04W 72/048* (2013.01)

(58) Field of Classification Search
None
See application file for complete search history.

(56) References Cited

U.S. PATENT DOCUMENTS

2010/0296472 A1  11/2010  Lee et al.
2013/0039195 A1*  2/2013  Weng ............... H04W 48/20
370/252
(Continued)

FOREIGN PATENT DOCUMENTS

CN  101911805 A  12/2010
CN  103370967 A  10/2013
(Continued)

OTHER PUBLICATIONS

"3rd Generation Partnership Project;Technical Specification Group Radio Access Network; Evolved Universal Terrestrial Radio Access (E-UTRA);Physical channels and modulation(Release 12)", 3GPP TS 36.211 V12.4.0 (Dec. 2014), 124 pages.
(Continued)

*Primary Examiner* — Diane L Lo
(74) *Attorney, Agent, or Firm* — Slater Matsil, LLP (57) ABSTRACT

Implementations described herein relate generally to a user device, to an access node, and to methods for a user device and for an access node. The user device includes a receiver configured to receive at least one downlink signal from an access node. The user device further includes a processor configured to measure the at least one downlink signal at two time instants, to determine if a difference of the measured at least one downlink signal at the two time instants exceeds a threshold, and to generate, when the difference exceeds the threshold, at least one uplink transmission. The user device further includes a transmitter configured to transmit the at least one uplink transmission over an uplink random access channel.

18 Claims, 5 Drawing Sheets

(51) Int. Cl.
*H04W 74/08* (2009.01)
*H04W 24/02* (2009.01)

(56) References Cited

U.S. PATENT DOCUMENTS

2013/0258965 A1* 10/2013 Geirhofer ........... H04W 72/048
370/329
2015/0223154 A1* 8/2015 Jeong .................... H04W 48/16
370/338
2016/0286470 A1* 9/2016 Lee ....................... H04W 48/16

FOREIGN PATENT DOCUMENTS

| CN | 104205700 A | 12/2014 |
| EP | 2265077 A1 | 12/2010 |
| EP | 2395787 A1 | 12/2011 |
| WO | 2009038303 A1 | 3/2009 |
| WO | 2009096698 A2 | 8/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, 83 pages.

* cited by examiner

DEVICES, NODES AND METHODS IN A WIRELESS COMMUNICATION NETWORK

CROSS-REFERENCE TO RELATED APPLICATIONS

This application is a continuation of International Application No. PCT/EP2015/054387, filed on Mar. 3, 2015, the disclosure of which is hereby incorporated by reference in its entirety.

TECHNICAL FIELD

Implementations described herein relate generally to a user device, to an access node, to methods for a user device and for an access node, and to a computer program implementing the methods.

BACKGROUND

A wireless network generally includes several Access Nodes (ANs) and several user devices. For a correct network operation, the user devices transmit UpLink (UL) reference signals, hereafter denoted beacons, which are received, detected and decoded at one or more access nodes. The access nodes and/or the network can utilize detection of such beacons and/or measurements made on such beacons in many ways. For example, the beacons may be used to geographically locate a user device in a particular area, to decide which access node that should serve a particular user device and/or to perform channel estimation.

Such uplink beacons can be narrowband or wideband in the frequency domain, in accordance with the number of contiguous subcarriers allocated for each user device. The user device allocation for uplink beacons can be signalled by the network via at least one access node e.g. by use of a DownLink (DL) control channel.

The rate at which a given user device transmits UL beacons can depend on many factors, and may cause problems. If, for example, the UL beacon transmission rate for a particular user device is low, the position of the user device may change significantly without the network being aware of such a change in position. Then, the network will not be able to reach the user device, e.g. in case there is DL data to be sent, since the access node that was previously able to connect to the user device is no longer able to do so. The downlink reachability will then have to be re-established again after the user device has transmitted the next UL beacon. Thus, some delay will here be incurred before the downlink reachability is restored.

Thus, the allocation of UL beacon and/or reference signal resources performed by the network may respond poorly to the needs of at least one particular user device at a specific time and location. This is for example problematic in situations where the user device suddenly changes from a static non-moving state to a moving state, or vice-versa. In such problematic cases, conventional solutions rely on the network for detecting that some performance metric is degrading. In other solutions, the user device measures and reports back to the network such performance metric degradation. The network must then react based on such degrading performance metric by increasing or decreasing the rate for transmission of UL beacons accordingly. The hereby provided reaction time between a change for the user device and the corresponding change in UL beacon transmission rate performed by the network is too long for many situations in the network.

SUMMARY

It is therefore an object to solve at least some of the above mentioned disadvantages and to improve the performance in a wireless communication network.

An "or" in this description and the corresponding claims is to be understood as a mathematical OR which covers "and" and "or", and is not to be understand as an XOR (exclusive OR).

Also, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

In this document, the expressions downlink (DL) is used for the transmission path from the access node to the user device. The expression uplink (UL) is used for the transmission path in the opposite direction, i.e., from the user device to the access node.

The above objectives are solved by the subject matter of the independent claims. Further advantageous implementation forms of the present invention can be found in the dependent claims.

According to a first aspect, the above mentioned objectives are achieved by a user device including: a receiver configured to receive at least one downlink signal from an access node;—a processor configured to measure the at least one downlink signal at two time instants;—determine if a difference of the measured at least one downlink signal at the two time instants exceeds a threshold; and generate, when the difference exceeds the threshold, at least one uplink transmission; and a transmitter configured to transmit the at least one uplink transmission over an uplink random access channel (RACH).

A user device, also known as a User Equipment (UE), a mobile station, wireless terminal and/or mobile terminal, is enabled to communicate wirelessly in a wireless communication network, sometimes also referred to as a cellular radio system. The communication may be made, e.g., between user devices, between a user device and a wire connected telephone and/or between a user device and a server via a Radio Access Network (RAN) and possibly one or more core networks.

The proposed user device can be used to enhance the network performance and reducing delay by allowing slow moving user devices to transmit UL beacons less often, and by allowing fast moving user devices to transmit UL beacons more often. This is possible since the user devices can here themselves proactively monitor the difference between the measurements of the downlink signal and send an uplink RACH transmission when a substantial change has occurred. Hereby, the delay involved in DL reachability for the user device is shortened. This will in turn also allow fast moving user devices to transmit UL beacons more often. To send the UL transmissions over the RACH is advantageous, since it is not possible for the network to know when, and how often, these UL transmissions will be sent.

Thus, the user devices can be responsible for noticing when they have changed their positions significantly. If a user device has changed its position significantly, a mechanism that allows the network to allocate a beacon for the user device is triggered. When the UL beacon is transmitted, the network will be able to maintain updated and correct position information for the used device. Hereby, the probability for the user device to lose its connection with the network/access node is decreased.

It should be noted that conventional network implementations, such as e.g. Long Term Evolution (LTE), do not consider user-initiated allocation requests for transmission of beacons.

Thus, user device initiated requests useful for increasing or decreasing the rate of UL beacon transmission is achieved by the user device. Hereby, the response time is reduced by allowing the user device to e.g. proactively request more beacon resources if they are needed instead of letting the network realizing this after noting a decrease in performance, or even a loss of connection. The flexibility and efficiency of allocating resources for UL beacons is hereby increased since the behaviour of the user device dictates the rate of the UL beacon transmissions.

The user device can here detect that a substantial change in its position, radio channel conditions, and/or mobility status has occurred if the difference Diff between two measurements exceeds the threshold $Diff_{thres}$; $Diff>Diff_{thres}$. When a substantial change has been detected, the user device can proactively trigger an uplink beacon allocation request over a random access channel RACH.

Also, an efficient spatio-time-frequency resource allocation is provided, since the uplink beacons are transmitted only when deemed necessary.

A major benefit for the proposed user device is that it provides a user-centric approach for the required UL beacon transmission resources a particular user device needs. This allows a more flexible and efficient use of resources devoted for beacon transmissions.

Additionally, discontinuous reception (DRX) with even longer period during which opportunity for DRX is possible, which can be assigned for hibernating and/or stationary user devices. If such a hibernating and/or stationary user device detects that a substantial change has occurred, it can inform the network about this change. Therefore, the user device can react before its connection is lost and also before the user device has moved too far from its serving access or network.

The user device according to the first aspect can utilize even longer discontinuous reception and/or transmission DRX/DTX cycles without increasing the probability of connection loss. This also results in improved energy savings.

Thus, the user device can autonomously identify substantial changes e.g. in the radio environment by, for example, monitoring downlink signals carried by the DL control channel, or by portions of it. The user device can also determine a substantial change in its mobility state based on the downlink signals. The user device can further use a random access channel to carry a request for a specific beacon allocation, e.g. to effect an increase or a decrease of the allocated beaconing transmission rate for a particular user device. The user device can further use a random access channel to transmit an unscheduled beacon transmission.

In a first possible implementation form of a user device according to the first aspect, the uplink transmission includes a request for a beacon transmission allocation.

The reaction time between a detected change for the user device and the corresponding change in UL beacon transmission rate performed by the network can be shortened by allowing the user device to request beacon transmission itself.

In a second possible implementation form of a user device according to the first implementation form of the first aspect, the request for a beacon transmission allocation includes one or more of: a request for shorter beacon transmission intervals; a request for longer beacon transmission intervals; a request for a start of a beacon transmission; a request for keeping the currently used beacon transmission unchanged; and a request for a stop of a beacon transmission.

The delay between a change experienced by the user device and the corresponding change in UL beacon transmission rate performed by the network is hereby shortened, since the user device can itself directly control the rate of UL beacon transmission. The user device control may here include e.g. a direct request for a start, a stop, an increase, or a decrease in the UL beacon transmission rate. This is particularly advantageous when a user device is in an idle-mode and thus does not have scheduled beacon transmissions. An on-demand positioning information update is hereby provided, since static user devices can request beacon transmissions less often than moving user devices.

In a third possible implementation form of a user device according to the first or second implementation form of the first aspect, the receiver is further configured to receive a beacon transmission allocation response in response to the request for a beacon transmission allocation; and the transmitter is further configured to transmit beacons according to the beacon transmission allocation response.

Hereby, the user device is quickly configurable to transmit UL beacon transmission such that the reachability delay is minimized, also when the user device is in an idle-mode.

In a fourth possible implementation form of a user device according to the third implementation form of the first aspect, the processor is further configured to: retransmit the request for a beacon transmission allocation if the beacon transmission allocation response has not been received; and re-establish the connection with the access node if the beacon transmission allocation response has not been received after the request for a beacon transmission allocation is retransmitted a certain number of times.

Thus, if after some time, the allocation request is not granted, a retransmission can be triggered. If this still does not result in a granted allocation request, connection re-establishment is performed. It can hereby be determined if a beacon allocation request has collided with some other allocation request, and a connection re-establishment can be performed if necessary. The use of one or more retransmissions, and possibly also access node connection re-establishment, ensures that no more request transmissions than are absolutely necessary are performed. This reduces the total load of the network. Also, a low complexity allocation request collision detection and retransmission is provided.

In a fifth possible implementation form of a user device according to the first aspect, the at least one uplink transmission includes a beacon.

Here, the beacon is transmitted directly as included in the UL transmission. This shortens the delay between a change experienced by the user device and the corresponding change in UL beacon transmission rate allocated by the network considerably.

In a sixth possible implementation form of a user device according to the first aspect as such or to any one of the preceding implementation forms of the first aspect, the at least one uplink transmission includes a request for a channel state information (CSI) report transmission allocation.

Thus, a CSI report transmission is here requested by the user device based on if a substantial change has occurred between the two measurements. The CSI reports will then be transmitted over the RACH. Also, the RACH can be used for transmitting CSI report configuration parameters. Thus, the access node can be provided with additional CSI reports gathered by the user device if CSI reports are decided to be needed.

Hereby, the network is able to get access to additional channel state information whenever the user device decides that the currently used periodic CSI reporting is not sufficient. This also means that no unnecessary channel state information transmissions have to be performed when there is no need for them. This reduces the total load in the network.

In a seventh possible implementation form of a user device according to the sixth implementation form of the first aspect, the request for a channel state information CSI report transmission allocation includes one or more of: a request for shorter channel state information CSI report transmission intervals; a request for longer channel state information CSI report transmission intervals; a request for a start of a channel state information CSI report transmission; a request for keeping the currently used channel state information CSI report transmission unchanged; and a request for a stop of a channel state information CSI report transmission.

The user device can hereby itself directly control the rate of CSI report transmissions. The user device control may here include e.g. a direct request for a start, a stop, an increase, or a decrease in the CSI report transmission rate. This is particularly advantageous when a user device is in an idle-mode and thus does not have scheduled CSI transmissions. This also eliminates CSI transmissions when there is no use for CSI reports. An on-demand positioning information update is provided, since static user devices can request CSI report transmissions less often than moving user devices.

In an eighth possible implementation form of a user device according to the sixth or seventh implementation form of the first aspect, the receiver is further configured to receive a channel state information CSI report transmission allocation response in response to the request for a channel state information CSI report transmission allocation; and the transmitter is further configured to transmit channel state information CSI reports according to the channel state information CSI report transmission allocation response.

Hereby, the user device can quickly be configured to transmit CSI reports over the RACH, also when the user device is in an idle-mode.

In a ninth possible implementation form of a user device according to the first aspect as such or to any one of the preceding implementation forms of the first aspect, the at least one uplink transmission includes at least one channel state information CSI report.

For this implementation form, the CSI report is transmitted directly as included in the UL transmission. This shortens the delay between a change experienced by the user device and the provided CSI report over the RACH and/or a change in CSI report allocation considerably.

In a tenth possible implementation form of a user device according to the first aspect as such or to any one of the preceding implementation forms of the first aspect, the at least one downlink signal includes one or more of: a control signal received over a downlink control channel; a default signal received over a downlink control channel; a data signal received over a downlink data channel; and a default signal received over a downlink data channel.

The user device measures the at least one downlink signal in order to detect e.g. a possible change in mobility and/or radio conditions for the user device. A number of signals may be used for these measurements, such as control signals and/or default signals received over a downlink control channel and/or over a downlink data channel. If such well defined signals are utilised for these measurements, the detection of changes is easily made. For example, if a default/dummy signal having well known characteristics is transmitted downlink and measured, a change in mobility and/or radio condition can quickly and easily be detected by the user device.

In an eleventh possible implementation form of a user device according to the first aspect as such or to any one of the preceding implementation forms of the first aspect, the processor is further configured to measure at least one of a signal strength, a signal power, and a signal energy of the at least one downlink signal.

By measuring one or more of these well defined characteristics of the at least one downlink signal, changes in one or more of a mobility state and a radio condition for the user device can easily and quickly be identified.

According to a second aspect, the above mentioned objectives are achieved by an access node including: a transmitter configured to transmit at least one downlink signal; a receiver configured to receive over a random access channel RACH at least one uplink transmission; and a processor configured to determine a transmission allocation for one or more of a beacon and a channel state information CSI report based on the at least one uplink transmission; wherein the transmitter is further configured to transmit a response corresponding to the determined transmission allocation downlink.

The access node may according to some embodiments be configured for downlink transmission and may be referred to, respectively, as e.g., a radio network node, a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the user device over a wireless interface, depending, e.g., of the radio access technology and/or terminology used.

The proposed access node can be used to enhance the network performance and reducing the delay by allowing slow moving user devices to transmit UL beacons and/or CSI report less often, while fast moving user devices may transmit more often. This is possible since the user devices can here themselves proactively monitor the difference between the measurements of the downlink signal and send an uplink RACH transmission when a substantial change has occurred. Hereby, the delay involved in DL reachability for the user device is shortened. This will in turn also allow fast moving user devices to transmit UL beacons and/or CSI reports more often. To send the UL transmission over the RACH is advantageous, since it is often not possible for the network to know when, and how often, these UL transmissions will be sent.

Thus, the user devices can be responsible for noticing when they have changed their positions significantly. If a user device has changed its position significantly, a mechanism that allows the network to allocate a beacon and/or a CSI report transmission for the user device is triggered.

Hereby, the probability for the user device to lose its connection with the network/access node is reduced.

Thus, a request for beacon transmission and/or CSI report transmission is here requested by the user device based on if a substantial change has occurred between the two measurements. Hereby, beacon transmission and/or CSI report transmission will only take place if they are needed. Beacons transmission and/or CSI report transmission will further be performed at a rate suitable for the mobility state and/or radio condition for the user device.

The access node also, together with the above mentioned user device, provides the advantages stated above for the user device.

In a first possible implementation form of an access node according to the second aspect, the at least one downlink signal includes one or more of: a control signal transmitted over a downlink control channel; a default signal transmitted over a downlink control channel; a data signal transmitted over a downlink data channel; and a default signal transmitted over a downlink data channel.

As stated above, the user device measures the at least one downlink signal in order to detect e.g. a possible change in mobility and/or radio conditions for the user device. A number of signals may be used for these measurements, such as control signals and/or default signals received over a downlink control channel and/or over a downlink data channel. If such well defined signals are utilised for these measurements, the detection of changes is easily made. For example, if a default/dummy signal having well known characteristics is transmitted downlink and measured, a change in mobility and/or radio condition can quickly and easily be detected by the user device.

According to a third aspect, the above mentioned objectives are achieved a method for a user device including: receiving at least one downlink signal from an access node; measuring the at least one downlink signal at two time instants; determining if a difference of the measured at least one downlink signal at the two time instants exceeds a threshold; rating, when the difference exceeds the threshold, at least one uplink transmission; and transmitting the at least one uplink transmission over an uplink random access channel RACH.

The proposed method can be used to enhance the network performance and reducing delay by allowing slow moving user devices to transmit UL beacons less often, and by allowing fast moving user devices to transmit UL beacons more often. This is possible since the user devices can here themselves proactively monitor the difference between the measurements of the downlink signal and send an uplink RACH transmission when a substantial change has occurred. Hereby, the delay involved in DL reachability for the user device is shortened. This will in turn also allow fast moving user devices to transmit UL beacons more often. To send the UL transmission over the RACH is advantageous, since it is often not possible for the network to know when, and how often, these UL transmissions will be sent.

Thus, the user devices can be responsible for noticing when they have changed their positions significantly. If a user device has changed its position significantly, a mechanism that allows the network to allocate a beacon for the user device is triggered. When the UL beacon is transmitted, the network will be able to maintain updated and correct position information for the used device. Hereby, the risk for the user device to lose its connection with the network/access node is reduced.

In a first possible implementation form of a method for a user device according to the third aspect, the uplink transmission includes a request for a beacon transmission allocation.

In a second possible implementation form of a method for a user device according to the first implementation form of the third aspect, the request for a beacon transmission allocation includes one or more of: a request for shorter beacon transmission intervals; a request for longer beacon transmission intervals; a request for a start of a beacon transmission; a request for keeping the currently used beacon transmission unchanged; and a request for a stop of a beacon transmission.

In a third possible implementation form of a method for a user device according to the first or second implementation form of the third aspect, the method further includes: receiving a beacon transmission allocation response in response to the request for a beacon transmission allocation; and transmitting beacons according to the beacon transmission allocation response.

In a fourth possible implementation form of a method for a user device according to the third implementation form of the third aspect, the method further including: retransmitting the request for a beacon transmission allocation if the beacon transmission allocation response has not been received; and re-establishing the connection with the access node if the beacon transmission allocation response has not been received after the request for a beacon transmission allocation is retransmitted a certain number of times.

In a fifth possible implementation form of a method for a user device according to the third aspect, the at least one uplink transmission includes a beacon.

In a sixth possible implementation form of a method for a user device according to the third aspect as such or to any one of the preceding implementation forms of the third aspect, the at least one uplink transmission includes a request for a channel state information CSI report transmission allocation.

In a seventh possible implementation form of a method for a user device according to the sixth implementation form of the third aspect, the request for a channel state information (CSI) report transmission allocation includes one or more of: a request for shorter channel state information CSI report transmission intervals; a request for longer channel state information CSI report transmission intervals; a request for a start of a channel state information CSI report transmission; a request for keeping the currently used channel state information CSI report transmission unchanged; and a request for a stop of a channel state information CSI report transmission.

In an eighth possible implementation form of a method for a user device according to the sixth or seventh implementation form of the third aspect, the method further including: receiving a channel state information CSI report transmission allocation response in response to the request for a channel state information CSI report transmission allocation; and transmitting channel state information CSI reports according to the channel state information CSI report transmission allocation response.

In a ninth possible implementation form of a method for a user device according to the third aspect as such or to any one of the preceding implementation forms of the third aspect, the at least one uplink transmission includes at least one channel state information CSI report.

In a tenth possible implementation form of a method for a user device according to the third aspect as such or to any one of the preceding implementation forms of the third aspect, the at least one downlink signal includes one or more of: a control signal received over a downlink control channel; a default signal received over a downlink control channel; a data signal received over a downlink data channel; and a default signal received over a downlink data channel.

In an eleventh possible implementation form of a method for a user device according to the third aspect as such or to any one of the preceding implementation forms of the third aspect, the method further includes measuring at least one of a signal strength, a signal power, and a signal energy of the at least one downlink signal.

According to a fourth aspect, the above mentioned objectives are achieved by a method for an access node, the method including: transmitting at least one downlink signal; receiving over a random access channel RACH at least one uplink transmission; determining a transmission allocation for one or more of a beacon and a channel state information CSI report based on the at least one uplink transmission; and transmitting a response corresponding the determined transmission allocation downlink.

The proposed access node method can be used to enhance the network performance and reducing delay by allowing slow moving user devices to transmit UL beacons and/or CSI report less often, while fast moving user devices may transmit more often. This is possible since the user devices can here themselves proactively monitor the difference between the measurements of the downlink signal and send an uplink RACH transmission when a substantial change has occurred. Hereby, the delay involved in DL reachability for the user device is shortened. This will in turn also allow fast moving user devices to transmit UL beacons and/or CSI reports more often. To send the UL transmissions over the RACH is advantageous, since it is often not possible for the network to know when, and how often, these UL transmissions will be sent.

Thus, the user devices can be responsible for noticing when they have changed their positions significantly. If a user device has changed its position significantly, a mechanism that allows the network to allocate a beacon and/or a CSI report transmission for the user device is triggered. Hereby, the risk for the user device to lose its connection with the network/access node is reduced.

Thus, a request for beacon transmission and/or CSI report transmission is here requested by the user device based on if a substantial change has occurred between the two measurements. Hereby, beacon transmission and/or CSI report transmission will only take place if they are needed. Beacons transmission and/or CSI report transmission will further be performed at a rate suitable for the mobility state and/or radio condition for the user device.

In a first possible implementation form of a method for an access node according to the fourth aspect, the at least one downlink signal includes one or more of: a control signal transmitted over a downlink control channel; a default signal transmitted over a downlink control channel; a data signal transmitted over a downlink data channel; and a default signal transmitted over a downlink data channel.

The advantages of the methods according to the third aspect or the fourth aspect, and their implementation forms, are the same as those for the corresponding device claims according to the first and second aspects, respectively.

The implementations described also relate to a computer program, characterized in code means, which when run by processing means causes the processing means to execute any described method. Further, the implementations described also relate to a computer program product comprising a computer readable medium and said mentioned computer program, wherein the computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the described aspects and implementation forms will be apparent from the following detailed description in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

BRIEF DESCRIPTION OF THE DRAWINGS

Embodiments of the invention are described in more detail with reference to attached drawings illustrating examples of embodiments of the invention in which.

DETAILED DESCRIPTION OF ILLUSTRATIVE EMBODIMENTS

The aspects described herein are defined as a user device, a method for a user device, an access node and a method in an access node, which may be put into practice in the implementation forms/embodiments described below. These implementation forms may, however, be exemplified and realised in many different ways and are not to be considered as limited to the implementation forms set forth herein. These implementation forms are provided so that this disclosure will be thorough and complete.

In wireless communication networks/systems, a user device is enabled to communicate wirelessly with other user devices, with a wire connected telephone and/or with a server via a Radio Access Network (RAN) and possibly one or more core networks. The wireless communication may comprise various communication services such as voice, messaging, packet data, video, broadcast, etc.

The user devices in a wireless communication system can transmit UL beacon transmissions, which are received, detected and decoded at one or more access nodes. The UL beacon transmissions may thereby be used to geographically locate the user device in a particular area, to decide which access node that should serve a particular user device and/or to perform channel estimation. The user device allocation for UL beacon transmission can be signalled by the network via at least one access node using a DL control channel.

Figure 1:
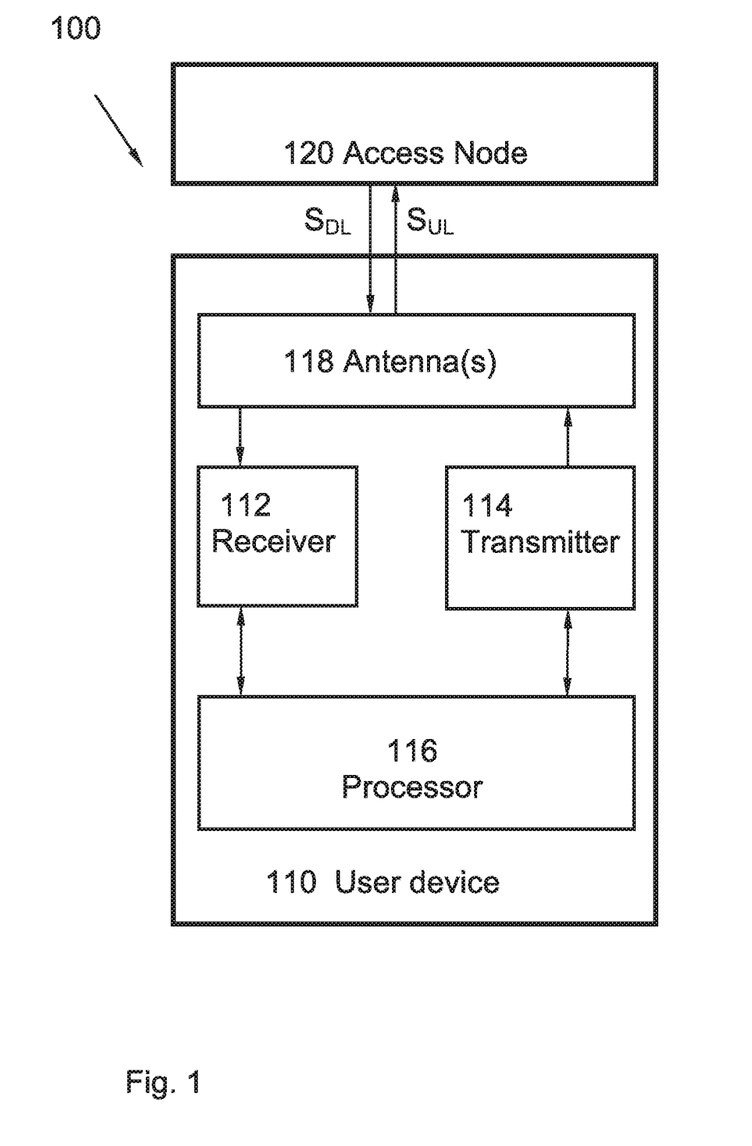
FIG. 1 is a block diagram illustrating a user device according to some embodiments.

According to a first aspect, a user device 110 is presented. The user device 110 is schematically illustrated in FIG. 1, and includes a receiver 112 configured to receive at least one downlink signal $S_{DL}$ from an access node 120 in a wireless communication system 100. The user device 110 also includes a processor 116 configured to measure the at least one downlink signal $S_{DL}$ at two different time instants $t_1$, $t_2$.

The processor 116 is further configured to determine a difference $\text{Diff}_{t1-t2}$ between the measurements at the two time instants $t_1$, $t_2$, and to determine if this difference exceeds a threshold $\text{Diff}_{thres}$; $\text{Diff}_{t1-t2} > \text{Diff}_{thres}$. The difference can here be determined for two consecutive measurements, i.e. based on measurements at two consecutive time instants, or can be determined for two measurements further apart in time.

When the difference Diff exceeds the threshold $\text{Diff}_{thres}$; $\text{Diff} > \text{Diff}_{thres}$; at least one uplink transmission $S_{UL}$ is generated by the processor 116.

The user device further includes a transmitter 114 configured to transmit the at least one uplink transmission $S_{UL}$ over an uplink random access channel (RACH).

One or more antenna devices 118 can be included in the user device 110 and can be used for the reception and transmission of signals.

The difference threshold $\text{Diff}_{thres}$ can here have a suitable value, such that a substantial change for the mobility state and/or the radio connection for user device is quickly and reliably identified. For example, the threshold $\text{Diff}_{thres}$ can have a value corresponding to 2 dB difference between the two measurements, and a substantial change can be identified if a difference in signal strength for the two time instants $t_1$, $t_2$ exceeds this threshold $\text{Diff}_{thres}$.

The wireless communication system 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Spécial Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1x RTT and High Rate Packet Data (HRPD), just to mention some few options.

Figure 2:
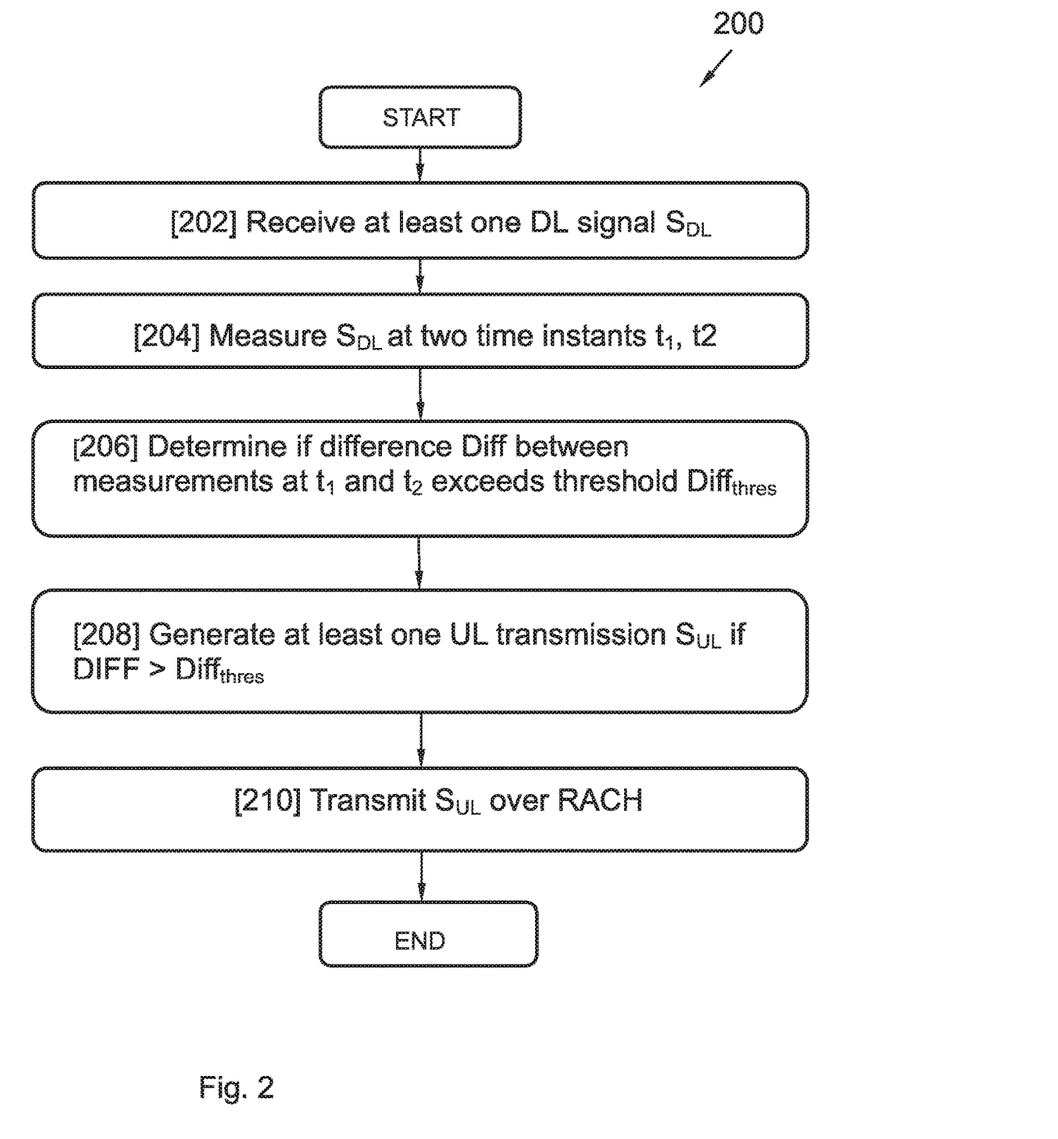
FIG. 2 is flow chart illustrating a method in a user device according to an embodiment.

FIG. 2 illustrates a flow chart diagram for method 200 for a user device 110 according to a third aspect.

In a first step 202 of the method for the user device 110 receives at least one downlink signal $S_{DL}$ from an access node 120, e.g. over a DL control channel or a DL data channel.

In a second step 204 of the method, the at least one downlink signal $S_{DL}$ is measured at two time instants $t_1$, $t_2$.

In a third step 206 of the method, it is determined if a difference Diff of the measured at least one downlink signal $S_{DL}$ at the two time instants $t_1$, $t_2$ exceeds a threshold $\text{Diff}_{thres}$; $\text{Diff} > \text{Diff}_{thres}$.

In a fourth step 208 of the method, at least one uplink transmission $S_{UL}$ is generated if the difference Diff exceeds the threshold Diff; $\text{Diff} > \text{Diff}_{thres}$.

In a fifth step 210 of the method, the at least one uplink transmission $S_{UL}$ is transmitted over an uplink random access channel RACH.

Figure 3:
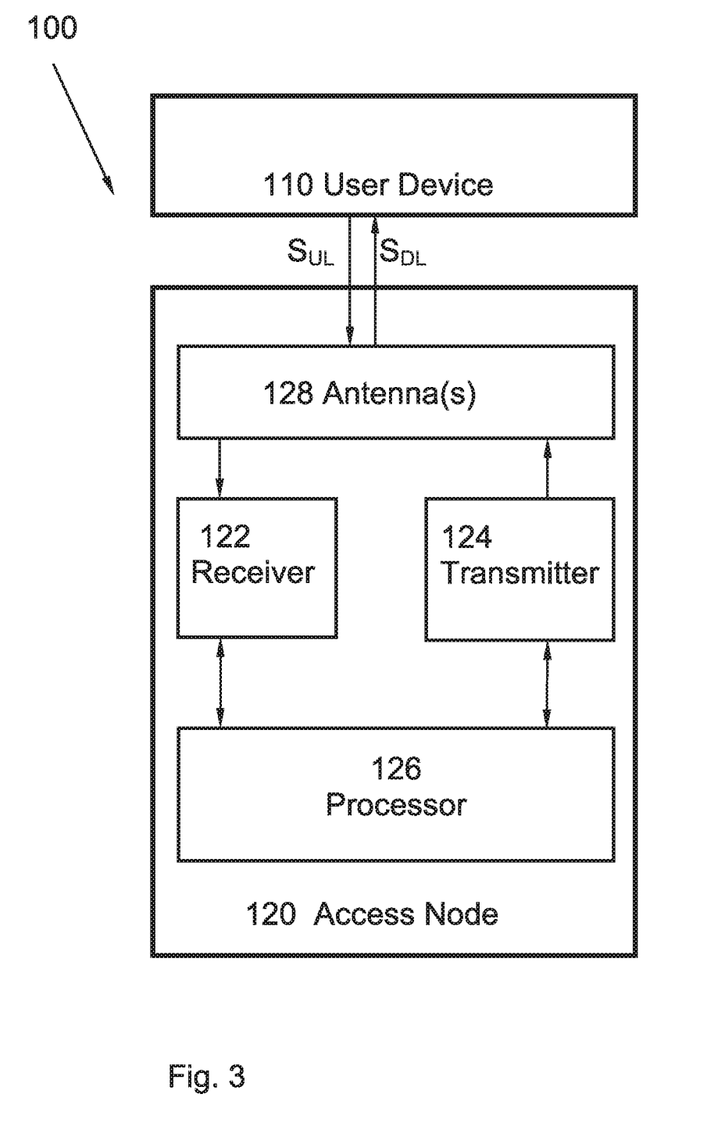
FIG. 3 is a block diagram illustrating an access node according to some embodiments.

An access node 120 according to a second aspect is illustrated in FIG. 3. The access node 120 includes a transmitter 124 configured to transmit at least one downlink signal $S_{DL}$ to one or more user devices 110. The access node 120 further includes a receiver 122 configured to receive at least one uplink transmission $S_{UL}$ over a random access channel RACH. One or more antenna devices 128 can be included in the access node and can be used for the reception and transmission of signals.

The access node 120 also includes a processor 126 configured to determine a transmission allocation for one or more of a beacon and a channel state information CSI report. The transmission allocation is here determined based on the at least one received uplink transmission $S_{UL}$.

The transmitter 124 is further configured to transmit a response corresponding to the determined transmission allocation downlink, i.e. in the downlink direction, to at least one user device.

Figure 4:
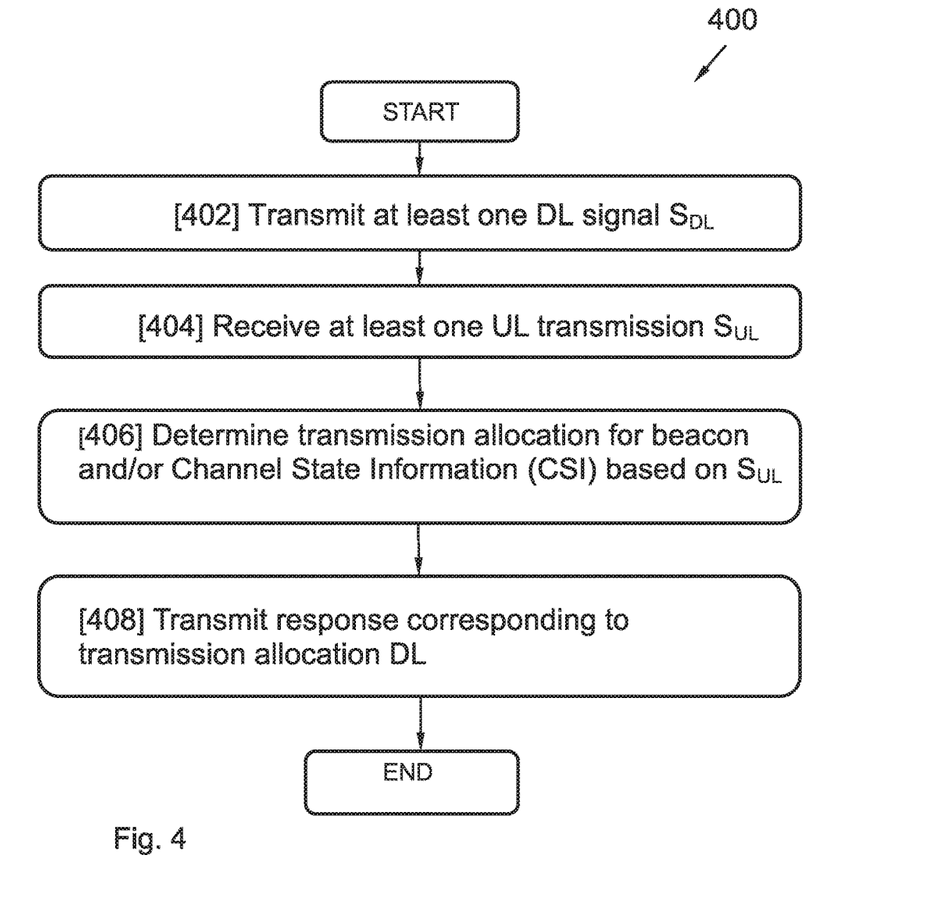
FIG. 4 is a flow chart illustrating a method in an access node according to an embodiment.

FIG. 4 illustrates a method 400 for an access node 120 according to the fourth aspect.

In a first step 402 of the method, at least one downlink signal $S_{DL}$ is transmitted to one or more user devices 110.

In a second step of the method 404, at least one uplink transmission $S_{UL}$ is received over a random access channel RACH from one or more user devices 110.

In a third step 406 of the method, a transmission allocation for one or more of a beacon and a channel state information CSI report is determined based on the at least one uplink transmission $S_{UL}$.

In a fourth step 408 of the method, a response corresponding to the determined transmission allocation is transmitted downlink to the one or more user devices 110.

The rate at which a given user device transmits UL beacons can depend on many factors. For example, the network may require different UL beaconing rates depending on whether the user device is static or is moving. Another example for when a network allocates an UL beacon for a user device is when there is downlink data to be sent to that particular user device. The user device according to the first aspect provides a fully configurable UL beacon transmission rate, being controlled by the user device.

The UL beacon transmission rate for a user device may also depend on the connection state for a particular user device. For example, when a user device is continuously receiving or sending data, i.e. when it is fully connected, it should have a high beacon transmission rate, such that beacons are frequently transmitted. On the other hand, when a user device is neither receiving nor transmitting data, and has also not been scheduled to do so, i.e. when the user device is in idle mode, the user device should have a low beacon transmission rate, such that beacons are transmitted at long intervals.

Figure 5:
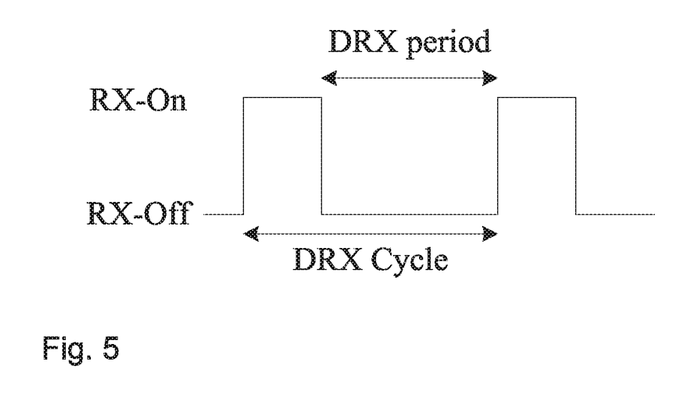
FIG. 5 is a basic illustration of a discontinuous reception concept.

In fact, user devices being in idle mode may have scheduled beacon transmissions. This allows for the user devices to have long periods of discontinuous reception and transmission DRX/DTX modes. In DRX/DTX modes, the user devices may turn off their baseband processing and radio functionalities in order to save energy. FIG. 5 schematically illustrates a discontinuous reception DRX concept. During the DRX period, the receiver is switched off, which enables energy savings in e.g. a user device. The DRX cycle is configured such that the user device is able to determine if there is a packet intended for the user device. The discontinuous transmission DTX concept is analogous to the DRX concept. Thus, the details and advantageous stated for the DRX concept in this document are also valid for the analogous TRX concept.

For services requiring different levels of connection, shorter or longer DRX periods may be utilized. For a service requiring continuous reception, no discontinuous reception DRX should be implemented. Energy savings is of utmost importance in current and future wireless communication systems.

The proposed user device, access node, and their corresponding methods can be used to enhance the network performance and reducing delay by allowing slow moving user devices to transmit UL beacons less often. This will in turn also allow fast moving user devices to transmit UL beacons more often. Hereby, the delay involved in DL reachability for the user devices can be reduced.

For example, the user devices can be responsible for noticing when they have changed their positions significantly. If a user device has changed its position significantly, a mechanism that allows the network to allocate a beacon for the user device is triggered. When the UL beacon is transmitted, the network will be able to maintain updated and correct position information for the user device. Hereby, the probability for the user device to lose its connection with the network/access node is decreased.

Compared to conventional solutions, such as in Long Term Evolution LTE, the proposed user device and access node, and their corresponding methods offer a very distinct advantage in that a user device can proactively request an allocation of a beacon transmissions, can request a change in the beacon allocation periodicity and/or can alter the configuration of the beacon transmissions.

According to an implementation form, the uplink transmission $S_{UL}$, being generated by the user device 110 and transmitted over the RACH, includes a request for a beacon transmission allocation. This request can include a request e.g. for shorter beacon transmission intervals, for longer beacon transmission intervals, for a start of a beacon transmission, for keeping the currently used beacon transmission unchanged, and/or for a stop of a beacon transmission. The request can for example include a user identifier, which may be temporary, such as a Radio Network Temporary Identifier (RNTI). The request may also include an indication of the type of beacon requested, which can e.g. be encoded in 3 bits. The indicated type/format of the beacon may also implicitly indicate a request for a certain beacon transmission interval, e.g. a request for longer or shorter beacon transmission intervals.

The user device 110 is then requested by the network to send UL beacon transmissions by means of dynamic, semi-persistent or persistent allocations. Beacon allocation information can be conveyed to the user device e.g. over a downlink control channel and/or over a shared downlink channel, by use of RRC signalling or some other essentially equivalent signalling.

The user device 110 is hereby able to send UL beacon transmissions dynamically, or is able to adapt the rate of UL beacon transmissions, by measuring/monitoring the DL signal $S_{DL}$ from the access node, e.g. conveyed over a DL control or data channel. Based on these measurements, it may be determined that a substantial change in the radio or mobility state has occurred. In this document, such a substantial change is defined by a change causing a difference Diff between two measurements of a downlink signal $S_{DL}$ being made at two different time instants $t_1$, $t_2$ to exceed a threshold $\text{Diff}_{thres}$; $\text{Diff} > \text{Diff}_{thres}$.

Such a substantial change may indicate that it is necessary to increase or decrease the beacon transmission rate. Such a substantial change may also indicate that an additional transmission beacon shall be sent which is not part of a regular beacon schedule. For example, a user device which suddenly starts moving after being static for a long period, or a previously moving user device alighting after a ride in a bus, a car or the like may cause such a change.

As stated above, such a substantial change is identified by a difference Diff between two measurements of a DL signal being made at two different time instants $t_1$, $t_2$ which exceeds a threshold $\text{Diff}_{thres}$; $\text{Diff} > \text{Diff}_{thres}$. The measurements can here measure e.g. a signal strength, a signal power, and/or a signal energy of the at least one downlink signal $S_{DL}$. For example, such a substantial change in the radio conditions may be detected by measuring the received signal strength, signal power and/or signal energy at two consecutive time instants over a specific time-frequency resource belonging to the DL control channel. Also, corresponding measurements performed on a DL reference signal could also be used for this purpose.

If the difference Diff between these two measurements exceeds a predefined threshold $\text{Diff}_{thres}$; $\text{Diff} > \text{Diff}_{thres}$; the user device thus notices that a substantial change has happened and that there is a need to increase the beaconing rate. On the contrary, if two such measurements are essentially equal over a given period of time, this may be an indication that radio conditions are somewhat static and possibly the UL beacon transmission rate can be kept or even reduced. The length of this period of time, i.e. the period of time between the two measurement time instants $t_1$, $t_2$, can be determined by, and adjusted by, the network.

The at least one downlink signal $S_{DL}$, on which the measurements are performed, may include a control signal or a default (dummy) signal received over a downlink control channel. The at least one downlink signal $S_{DL}$ may also include a data signal or a default (dummy) signal received over a downlink data channel.

For example, each access node 120 can transmit DL control information on a preconfigured subset of the time-frequency resources of the DL control channel, with a preconfigured transmission power. This allows the user devices 110 to observe if the received signal power carried by the time-frequency resources associated with different access nodes 120 change. The user devices 110 may here e.g. observe relative changes between the received signal strengths received from different access nodes 120 over time.

To further support the possibility for the user device to detect a change for signals carried by the DL control channel, each access node may be configured to always transmit on at least part of its associated time-frequency resources. These transmissions may then include either actual control signals, when such are needed, or dummy signals, when there are no control messages to be transmitted.

Figure 6:
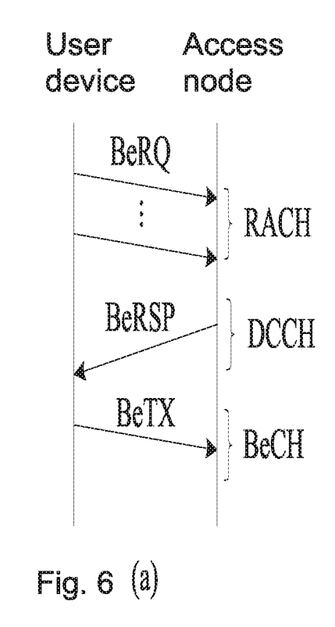
FIGS. 6*a-b* are schematic illustrations of signalling.

An example of a proposed signalling between a user device and an access node is schematically illustrated in FIG. 6a.

The user device 110, and its receiver 112, can further be configured to receive a beacon transmission allocation response BeRSP over a Downlink Control Channel DCCH in response to a request for a beacon transmission allocation BeRQ over the Random Access Channel RACH. The user device 110, and its transmitter 114 can further be configured to transmit BeTX beacons according to the beacon transmission allocation response BeRSP e.g. over an uplink Beacon Channel BeCH.

The user device 110, and its processor 116 can further be configured to retransmit the request for a beacon transmission allocation BeRQ if the beacon transmission allocation response BeRSP has not been received. If necessary, i.e. if the beacon transmission allocation response has not been received after the request for a beacon transmission allocation BeRQ has been retransmitted a certain number of times, the connection with the access node 120 is re-established. The number of times the BeRQ should be retransmitted can be determined by, and adjusted by, the network. The number of times may also have been signalled/transmitted to the user device at an earlier stage, and may thus be preconfigured.

Thus, once the user device 110 detects that a substantial change has occurred, it requests an increase or decrease in the current UL beacon transmission allocation by sending a request BeRQ over a random access channel RACH, or it requests resources to send a single UL beacon. If the request is successfully received by the network, an updated beacon transmission allocation information is sent BeRSP over the DL control channel within a preconfigured time. Otherwise, the user device 110 continues to send its requests BeRQ over the random access channel RACH. If the network does not reply to the scheduling requests BeRQ from the user device after a certain number of request attempts, the connection can be considered as lost and the user device 110 should re-establish its connection to the network.

Thus, a beacon allocation response BeRSP is here sent by the network/access node to inform the user device 110 that the beacon allocation request has been successfully received. At this point the user device may stop sending requests. FIG. 6a illustrates the beacon allocation request BeRQ procedure using the RACH, which may involve several beacon allocation attempts, e.g. including one or more of a request BeRQ for increase and/or decrease of the beacon transmission allocation rate. Once the request BeRQ is received and processed by the access node 120, an allocation response BeRSP is sent to the user device 110 on a DL control channel DCCH including the information on how to send UL beacon transmissions BeTX. In addition, the user device 110 can realize that the beacon allocation request BeRQ has collided in the RACH by noting that no new beacon allocation information has been received after a period of time has expired. This period of time can determined by, and adjusted by, the network. The period of time can also have been signalled/transmitted to the user device at an earlier stage and may thus be seen as preconfigured.

According to an implementation form, the user device 110 and its transmitter 114 are configured to directly include a beacon in the at least one uplink transmission BeTX over the random access channel RACH. An example of this signalling is schematically illustrated in FIG. 6b. Thus, the RACH could also be used for the actual transmission of the beacon itself BeTX, instead of, or in addition to, being used for transmissions of the beacon allocation request BeRQ. This unscheduled beacon transmission BeTX then shares the random access channel RACH resources with other unscheduled beacon transmissions BeTX and other beacon allocation requests BeRQ. An advantage for the implementation form illustrated in FIG. 6b is that a very fast beacon signal BeTX is provided uplink to the network/access node.

According to an implementation form, the beacon transmission BeTX itself may be used to indicate whether an increased or a decreased beacon transmission rate is requested to be allocated to the user device 110. Provided the reference signal space is large enough, the user device can here chose among e.g. at least 3 different reference signals/beacons to indicate to the network that the current rate for the beacon transmission allocation should be decreased, increased or remain unaltered respectively.

According to an implementation form, the procedure described herein for updating the beacon transmission allocation is performed during periods when the user device 110 is hibernating for a relatively long period of time. This would make sure that the user device still has valid connection during such hibernating periods.

According to an implementation form, the at least one uplink transmission $S_{UL}$ includes a request for a channel state information CSI report transmission allocation. This request for a CSI report transmission allocation can include a request for shorter or longer CSI report transmission intervals, or for keeping the currently used CSI report transmission interval unchanged. This request for a CSI report transmission allocation can also include a request for a start of a CSI report transmission, or a request for a stop of a CSI report transmission. The request can for example include a user identifier, which may be temporary, such as a Radio Network Temporary Identifier RNTI. The request may also include an indication of the type of CSI report requested, which can e.g. be encoded in 3 bits. The indicated type/format of the CSI report may also implicitly indicate a request for a certain CSI report transmission interval, e.g. a request for longer or shorter CSI report transmission intervals.

The receiver 112 of the user device 110 can here further be configured to receive a CSI report transmission allocation response from an access node 120 in response to the request for a CSI report transmission allocation. Also, the transmitter 114 of the user device 110 is further configured to transmit CSI reports to an access node 120 according to the CSI report transmission allocation response received from the access node 120. Thus, the allocation procedure for allocating CSI report transmission may be performed correspondingly to the procedure for allocation of beacon transmission as illustrated in FIG. 6a.

According to an implementation form, user device 110 and its transmitter are configured to include at least one CSI report in the at least one uplink transmission $S_{UL}$ over the RACH. Thus, a direct transmission of a CSI report may be performed correspondingly to the procedure for direct beacon transmission as illustrated in FIG. 6b.

In conventional LTE systems, periodic CSI reporting is done over the Physical Uplink Control Channel (PUCCH) whereas aperiodic CSI reporting is done over the Physical Uplink Shared Channel (PUSCH). However, according to different implementation forms of the user device, access node, and corresponding method proposed and described herein, the random access channel RACH could instead be used to send CSI reports gathered by the user device 110. Thus, if a user device realizes that current periodic CSI reporting over an UL control channel is not sufficient, the user device 110 may send an additional CSI report over the RACH. Alternatively, the user device could send CSI reporting configuration requests/commands over the RACH when the user device realizes that the current CSI report period is either too short or too long.

Furthermore, the methods described above and in the claims may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the user device 110 and the access node 120 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the presented aspects and implementation forms.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A user device including:
    a receiver configured to receive a plurality of downlink signals comprising a first downlink signal sent from an access node and a second downlink signal sent from the access node;
    a processor;
    a memory storing a program to be executed in the processor, the program comprising instructions for:
        measuring the first downlink signal at a first time instant,
        measuring the second downlink signal at a second time instant,
        determining a difference between the measured first downlink signal sent from the access node and the measured second downlink signal sent from the access node, and
        generating, when the difference exceeds a threshold, at least one uplink transmission; and
    a transmitter configured to transmit the at least one uplink transmission over an uplink random access channel (RACH).

2. The user device as claimed in claim 1, wherein the at least one uplink transmission includes a request for a beacon transmission allocation.

3. The user device as claimed in claim 2, wherein the request for a beacon transmission allocation includes one or more of:
    a request for shorter beacon transmission intervals;
    a request for longer beacon transmission intervals;
    a request for a start of a beacon transmission;
    a request for keeping the beacon transmission that is being currently used to be unchanged; and
    a request for a stop of a beacon transmission.

4. The user device as claimed in claim 2, wherein
    the receiver is further configured to receive a beacon transmission allocation response in response to the request for a beacon transmission allocation; and
    the transmitter is further configured to transmit beacons according to the beacon transmission allocation response.

5. The user device as claimed in claim 4, wherein the program comprises further instructions for:
    retransmitting the request for a beacon transmission allocation if the beacon transmission allocation response has not been received; and
    re-establishing a connection with the access node if the beacon transmission allocation response has not been received after the request for a beacon transmission allocation is retransmitted a certain number of times.

6. The user device as claimed in claim 1, wherein the at least one uplink transmission includes a beacon.

7. The user device as claimed in claim 1, wherein the at least one uplink transmission includes a request for a channel state information (CSI) report transmission allocation.

8. The user device as claimed in claim 7, wherein the request for a channel state information (CSI) report transmission allocation includes one or more of:
    a request for shorter channel state information (CSI) report transmission intervals;
    a request for longer channel state information (CSI) report transmission intervals;
    a request for a start of a channel state information (CSI) report transmission;
    a request for keeping the channel state information (CSI) report transmission that is being currently used to be unchanged; and
    a request for a stop of a channel state information (CSI) report transmission.

9. The user device as claimed in claim 7, wherein
    the receiver is further configured to receive a channel state information (CSI) report transmission allocation response in response to the request for a channel state information (CSI) report transmission allocation; and
    the transmitter is further configured to transmit channel state information (CSI) reports according to the channel state information (CSI) report transmission allocation response.

10. The user device as claimed in claim 1, wherein the at least one uplink transmission includes at least one channel state information (CSI) report.

11. The user device as claimed in claim 1, wherein the plurality of downlink signals includes one or more of:
    a control signal received over a downlink control channel;
    a default signal received over a downlink control channel;
    a data signal received over a downlink data channel; and
    a default signal received over a downlink data channel.

12. The user device as claimed in claim 1, wherein the program comprises further instructions for measuring at least one of a signal strength, a signal power, and a signal energy of the plurality of downlink signals.

13. A method for a user device including:
    receiving a plurality of downlink signals comprising a first downlink signal sent from an access node and a second downlink signal sent from the access node;
    measuring the first downlink signal at a first time instant;
    measuring the second downlink signal at a second time instant;
    determining a difference between the measured first downlink signal sent from the access node and the measured second downlink signal sent from the access node;
    generating, when the difference exceeds a threshold, at least one uplink transmission; and transmitting the at least one uplink transmission over an uplink random access channel (RACH).

14. A user device including:
a receiver configured to receive at least one downlink signal comprising a first downlink signal and a second downlink signal from an access node;
a processor;
a memory storing a program to be executed in the processor, the program comprising instructions for:
   measuring the first downlink signal at a first time instant,
   measuring the second downlink signal at a second time instant,
   determining a difference between the measured first downlink signal and the measured second downlink signal, and
   generating, when the difference exceeds a threshold, at least one uplink transmission; and
a transmitter configured to transmit the at least one uplink transmission over an uplink random access channel (RACH), wherein the at least one uplink transmission includes a request for a channel state information (CSI) report transmission allocation.

15. The user device as claimed in claim 14, wherein the request for a channel state information (CSI) report transmission allocation includes one or more of:
   a request for shorter channel state information (CSI) report transmission intervals;
   a request for longer channel state information (CSI) report transmission intervals;
   a request for a start of a channel state information (CSI) report transmission;
   a request for keeping the channel state information (CSI) report transmission that is being currently used to be unchanged; and
   a request for a stop of a channel state information (CSI) report transmission.

16. The user device as claimed in claim 14, wherein
the receiver is further configured to receive a channel state information (CSI) report transmission allocation response in response to the request for a channel state information (CSI) report transmission allocation; and
the transmitter is further configured to transmit channel state information (CSI) reports according to the channel state information (CSI) report transmission allocation response.

17. The user device as claimed in claim 14, wherein the at least one downlink signal includes one or more of:
   a control signal received over a downlink control channel;
   a default signal received over a downlink control channel;
   a data signal received over a downlink data channel; and
   a default signal received over a downlink data channel.

18. The user device as claimed in claim 14, wherein the program comprises further instructions for measuring at least one of a signal strength, a signal power, and a signal energy of the at least one downlink signal.

* * * * *